3,392,047
**PAPER CONTAINING OXIDIZED POLY-
BUTADIENE FOR IMPROVED WET
STRENGTH**
John T. Massengale, West Chester, Pa., assignor to
FMC Corporation, Philadelphia, Pa., a corporation of Delaware
No Drawing. Filed Oct. 19, 1964, Ser. No. 404,977
5 Claims. (Cl. 117—155)

ABSTRACT OF THE DISCLOSURE

A paper impregnated with a small amount of a specified oxidized polybutadiene to improve its wet strength, is disclosed herein.

---

Increased wet strength of paper is a property to be desired. Many resins have been employed for this purpose but few are entirely satisfactory.

It is an object of this invention to provide paper having improved wet strength.

It is another object of this invention to provide a paper of improved wet strength, good water absorption properties and satisfactory stiffness characteristics.

These and other objects are accomplished in accordance with this invention which comprises paper impregnated with up to about 4.0% by weight of a lower aliphatic peracid oxidized polybutadiene having an epoxy content of at least 5% by weight.

The epoxypolybutadiene resin is prepared by oxidizing a polybutadiene resin with a lower aliphatic peracid including, for example, peracetic and performic acid. The oxidized resin has an epoxy content of at least 5% and preferably about 9% based on the weight of the resin. The uncured oxidized polybutadiene resins as described, for example, in U.S. Patents 2,829,135 and 3,030,336, are suitable for this invention.

Paper, in accordance with this invention, includes all materials which are encompassed within the ordinary and usual meaning of the word. Generally speaking, paper includes cellulosic and other vegetable fibers formed into thin felts or non-woven sheets, said sheets being useful, for example, as writing paper, shopping bags, wrapping paper, newsprint, napkins, tissues, cardboard, and when laminated, as paper board and corrugated paper for containers.

The oxidized resin is applied to either preformed paper, or during the manufacture of the paper, in the pulp or to the still-wet formed paper web.

It is applied either dissolved in a suitable organic solvent or dispersed in an aqueous emulsion. Preferred organic solvents include the lower alkyl acetates, particularly butyl acetate. The solutions generally range in concentration from about 0.1 up to 3.0%, but preferably from about 0.5 to 2.0% by weight.

Using a solution to apply the resin, it is incorporated in amounts of up to about 4.0% to produce maximum wet strength, however, to minimize the effect on water absorption properties amounts of less than about 2.0% based on the weight of the paper should be incorporated.

To promote faster curing, a small amount of a curing agent may be incorporated with the oxidized resin. Curing agents which may be employed generally include acids, acid anhydrides, glycols, polyphenols, and polysulfides. More particularly, saturated or unsaturated dicarboxylic acids or their anhydrides, for example, adipic, fumaric, maleic, oxalic, sebacic and tartaric acids, and maleic, succinic, phthalic, tetrahydrophthalic and pyromellitic anhydrides. Mixtures and adducts of these acids and acid-anhydrides with glycols or polyglycols are also useful curing agents. The adduct of pyromellitic dianhydride and polyethylene glycol has been found to be an excellent curing agent for this invention. The curing agent is generally used in amounts ranging from 5 to 20% based on the weight of the oxidized resin.

Emulsions of the oxidized resins in water are first made up with high concentrations of resins and suitable amounts of emulsifying agents in water. The emulsion is then diluted to solid amounts, for example, of from about 0.1 to 2%. Incorporating the resin in paper using an emulsion system produces improvement in wet strength up to amounts of 1.5% based on the weight of the paper. This increase in wet strength is accomplished without harming the water absorption properties of the paper.

Emulsifying agents include, for example, esters of hexitans, polyoxyethylene ethers of esters of hexitans, aromatic polyglycol ethers, fatty acid esters of polyether alcohols, etc.

Wet strength test

Test paper, which was conditioned at 45% relative humidity and 75° F. overnight was clamped in an aluminum frame having interior dimensions of 6½ by 10 inches. The frame was then submerged in water to a paper depth of one inch. After one minute soaking time a flat, two-inch diameter bottom glass jar, five inches in height and weighing less than 200 grams was placed on the center of the paper. Lead shot was poured slowly but uniformly into the jar until the jar broke through the paper. The dried jar was then weighed to determine the wet strength for $\pi$ square inches area of paper. Four samples were tested for each type of test paper.

Water absorption test

Sample test paper was first weighed in a weighing can. Then, the sample was completely submerged in distilled water for fifteen seconds. The sample was removed and allowed to drain for five seconds at 45% relative humidity. The test sample was then immediately weighed in the weighing can.

Several different types of paper which had not previously received a resin treatment were used for the foregoing test procedures. They included:

A. Filter paper having a thickness of 10.8–11.7 mils and a water absorbency of 3.3 grams of water per gram of paper.

B. Filter paper having a thickness of 7.7–8.4 mils and a water absorbency of 2.9 grams of water per gram of paper.

C. Yellow writing paper having a thickness of 2.6 mils and a water absorbency of 2.0 grams of water per gram of paper.

An emulsion was prepared by slowly adding 75 parts of "Oxiron 2000," a commercially available oxidized polybutadiene, at 70° C. to an agitated solution at 50° C. of 2 parts Neutronyx 611, 2 parts Neutronyx 626, and 21 parts water. "Oxiron 2000" is a peracetic acid oxidized polybutadiene resin having a viscosity of 1800 poise at 25° C., an epoxy content of 9% and a hydroxyl content of 2.5% based on the weight of the resin. Neutronyx 611, a commercially available emulsifying agent, is an alkyl phenol polyglycol ether containing 9 moles of ethylene oxide and Neutronyx 626 is an alkyl phenol polyglycol ether containing 6 moles of ethylene oxide.

This emulsion was then diluted to a level of 0.26% by weight of solids by adding it slowly to agitated distilled water.

Paper was treated by submerging it in the emulsion contained in a large tray for fifteen seconds. The paper was then carefully wrung in a wringer, clamped in a metal frame and dried in an oven at 85° C. for two minutes, except paper C which was dried for one minute.

A solution of the oxidized polybutadiene was prepared by dissolving "Oxiron 2000" in hot butyl acetate. Solutions having concentrations of 0.5, 1.0 and 2.0 by weight were used. One part of the adduct of pyromellitic dianhydride and polyethylene glycol was added to each solution per eight parts of "Oxiron 2000" by first dissolving the adduct in a small amount of methyl ethyl ketone. Papers treated with the solutions were first clamped in metal frames and the solutions applied to both sides of the paper. Papers A and B were then dried at 85° C. for two minutes while papers C were dried for one minute.

The following table shows the results of testing of the various papers for wet strength and water absorption.

TABLE

| Paper | Treatment | Resin Pick-up, percent | Avg. Wet Strength, gms. | Water Absorption, gms. |
|---|---|---|---|---|
| A | None | | 796 | 3.27 |
| A | 0.26% Emulsion | 1.25 | 1,185 | 3.16 |
| A | 1.0% Emulsion | 1.73 | 809 | 2.99 |
| A | 0.5% Solution | 1.30 | 1,941 | 1.40 |
| A | 1.0% Solution | 1.97 | 2,438 | 1.40 |
| A | 2.0% Solution | 4.75 | 2,389 | 1.57 |
| B | None | | 220 | 2.86 |
| B | 0.26% Emulsion | 1.60 | 872 | 3.02 |
| B | 1.0% Emulsion | 1.81 | 265 | 2.85 |
| B | 0.5% Solution | 0.91 | 1,354 | 1.31 |
| B | 1.0% Solution | 1.71 | 1,766 | 1.28 |
| B | 2.0% Solution | 3.86 | 2,986 | 1.21 |
| C | None | | 371 | 2.01 |
| C | 0.26% Emulsion | 0.43 | 543 | 1.91 |
| C | 0.5% Solution | 0.62 | 635 | 1.75 |
| C | 1.0% Solution | 0.92 | 683 | 1.71 |

It can be seen from the above table that when resin pick-up in the emulsion treated paper exceeds a certain amount, the wet strength falls off drastically. The same is generally true of the solution treated paper except that the pick-up amount at which point the wet strength falls off is higher. However, the table shows that the wet strength is greatly improved with no loss in water absorbency when the paper is treated with an emulsion of oxidized polybutadiene. It also shows a great improvement in wet strength with some loss of water absorbency when the paper is treated with a solution of the oxidized polybutadiene.

Various changes and modifications may be made practicing the invention without departing from the spirit and scope thereof and, therefore, the invention is not to be limited except as defined in the appended claims.

I claim:

1. Paper impregnated with up to about 4.0% by weight of a lower aliphatic peracid oxidized polybutadiene having an epoxy content of at least 5% by weight, said paper having improved wet strength.

2. Paper impregnated with up to about 1.5% by weight of a lower aliphatic peracid oxidized polybutadiene having an epoxy content of at least 5% by weight, said paper having improved wet strength.

3. A method of improving the wet strength of paper which comprises treating said paper with a lower aliphatic peracid oxidized polybutadiene having an epoxy content of at least 5% by weight and a curing agent for said oxidized polybutadiene in a liquid carrier said oxidized polybutadiene being present in said liquid carrier in a concentration ranging from about 0.1 up to 3.0% by weight, and drying the paper.

4. A method of improving the wet strength of paper which comprises treating said paper with an organic solvent solution of a lower aliphatic peracid oxidized polybutadiene having an epoxy content of at least 5% by weight, said oxidized polybutadiene being present in said solution in a concentration ranging from about 0.5 up to 2.0% by weight, and from 5 to 20% based on the weight of the oxidized polybutadiene of the adduct of pyromellitic dianhydride and polyethylene glycol, and drying the paper.

5. A method of improving the wet strength of paper which comprises treating said paper with an aqueous dispersion at a concentration of about 0.1 to 2% by weight of a lower aliphatic peracid oxidized polybutadiene having an epoxy content of at least 5% by weight, and drying the paper.

References Cited

UNITED STATES PATENTS

| | | | |
|---|---|---|---|
| 2,474,801 | 6/1949 | Owen | 162—169 |
| 2,537,114 | 1/1951 | Young et al | 117—155 |
| 2,650,163 | 8/1953 | Horsey et al. | 162—169 |
| 2,829,130 | 4/1958 | Greenspan et al. | 260—94.7 X |
| 2,829,135 | 4/1958 | Greenspan et al. | 260—94.7 |
| 2,946,756 | 7/1960 | Wheelock et al. | 260—94.7 X |
| 3,022,322 | 2/1962 | Wheelock et al. | 260—94.7 X |
| 3,030,336 | 4/1962 | Greenspan et al. | 260—47 |
| 3,073,796 | 1/1963 | Reich et al. | 260—94.7 X |

WILLIAM D. MARTIN, *Primary Examiner.*

MURRAY KATZ, *Examiner.*

M. LUSIGNAN, *Assistant Examiner.*